(12) United States Patent
Raskar et al.

(10) Patent No.: US 9,451,177 B2
(45) Date of Patent: Sep. 20, 2016

(54) METHODS AND APPARATUS FOR HIGH SPEED CAMERA

(71) Applicants: Ramesh Raskar, Cambridge, MA (US); Christopher Barsi, Exeter, NH (US)

(72) Inventors: Ramesh Raskar, Cambridge, MA (US); Christopher Barsi, Exeter, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 145 days.

(21) Appl. No.: 14/304,507

(22) Filed: Jun. 13, 2014

(65) Prior Publication Data
US 2014/0367558 A1    Dec. 18, 2014

Related U.S. Application Data

(60) Provisional application No. 61/836,479, filed on Jun. 18, 2013.

(51) Int. Cl.
| | | |
|---|---|---|
| *G01J 1/42* | (2006.01) | |
| *H04N 5/243* | (2006.01) | |
| *H04N 5/235* | (2006.01) | |
| *H04N 5/30* | (2006.01) | |
| *H01J 31/50* | (2006.01) | |
| *G01J 11/00* | (2006.01) | |

(52) U.S. Cl.
CPC ............ *H04N 5/243* (2013.01); *H01J 31/50* (2013.01); *H04N 5/2354* (2013.01); *H04N 5/30* (2013.01); *G01J 11/00* (2013.01)

(58) Field of Classification Search
CPC ...... H01N 5/243; H04N 5/2354; H04N 5/30; H01J 31/50; H01J 31/501; H01J 31/502; H01J 31/503; H01J 31/506; H01J 31/56; H01J 31/08; G01J 11/00; G01J 1/42; G03B 39/00; G03B 39/005
See application file for complete search history.

(56) References Cited

U.S. PATENT DOCUMENTS

| | | | |
|---|---|---|---|
| 3,161,885 A | | 12/1964 | Corcoran |
| 3,207,944 A | * | 9/1965 | Mongeon ............ G03B 39/005 315/10 |
| 3,245,748 A | | 4/1966 | Wadsworth et al. |
| 3,378,721 A | * | 4/1968 | Huston ................ G03B 39/005 313/421 |
| 3,485,159 A | | 12/1969 | McCall |
| 3,555,346 A | * | 1/1971 | McGee ................... H01J 31/52 315/10 |
| 3,761,614 A | * | 9/1973 | Bradley ................ H01J 31/502 313/529 |
| 3,887,841 A | * | 6/1975 | Huston ................ H01J 31/502 315/391 |

(Continued)

OTHER PUBLICATIONS

Hansard, M., Lee, S., Choi, O., Horaud, R., 2012, Time-of-Flight Cameras, Principles, Methods and Applications, SpringerBriefs in Computer Science, Dec. 2012.

*Primary Examiner* — John Lee
(74) *Attorney, Agent, or Firm* — Stephen R. Otis

(57) ABSTRACT

In exemplary implementations of this invention, a camera can capture multiple millions of frames per second, such that each frame is 2D image, rather than a streak. A light source in the camera emits ultrashort pulses of light to illuminate a scene. Scattered light from the scene returns to the camera. This incoming light strikes a photocathode, which emits electrons, which are detected by a set of phosphor blocks, which emit light, which is detected by a light sensor. Voltage is applied to plates to create an electric field that deflects the electrons. The voltage varies in a temporal "stepladder" pattern, deflecting the electrons by different amounts, such that the electrons hit different phosphor blocks at different times during the sequence. Each phosphor block (together with the light sensor) captures a separate frame in the sequence. A mask may be used to increase resolution.

20 Claims, 5 Drawing Sheets

(56) References Cited

U.S. PATENT DOCUMENTS

| | | | | |
|---|---|---|---|---|
| 4,243,878 A | * | 1/1981 | Kalibjian | H01J 31/502 250/214 VT |
| 4,467,189 A | * | 8/1984 | Tsuchiya | H01J 31/502 250/214 VT |
| 4,528,447 A | * | 7/1985 | Fitts | H01J 31/502 250/214 VT |
| 4,536,436 A | * | 8/1985 | Maeoka | G21K 4/00 250/483.1 |
| 4,565,923 A | * | 1/1986 | Huston | H04N 3/122 250/214 VT |
| 4,694,220 A | * | 9/1987 | Kinoshita | H01J 31/502 313/365 |
| 4,851,914 A | * | 7/1989 | Pfanhouser | H04N 5/2353 348/217.1 |
| 4,875,093 A | * | 10/1989 | Koishi | H04N 5/228 313/524 |
| 4,945,416 A | * | 7/1990 | Salgues | H01J 31/502 348/215.1 |
| 5,017,829 A | * | 5/1991 | Koishi | H01J 31/502 250/214 VT |
| 5,126,874 A | * | 6/1992 | Alfano | G02F 1/3515 359/240 |
| 5,631,459 A | * | 5/1997 | de Groot | H01J 31/501 250/207 |
| 5,636,050 A | * | 6/1997 | Alfano | G01J 11/00 359/238 |
| 5,668,593 A | | 9/1997 | Lareau et al. | |
| 5,925,877 A | * | 7/1999 | Suzuki | G01J 11/00 250/214 VT |
| 6,194,700 B1 | * | 2/2001 | Pradere | H01J 29/38 250/214 VT |
| H1979 H | * | 8/2001 | Hopkins | 250/214 VT |
| 7,010,158 B2 | * | 3/2006 | Cahill | G06K 9/00201 345/419 |
| 2001/0036209 A1 | * | 11/2001 | Delfyett | H01S 5/065 372/23 |
| 2003/0048921 A1 | * | 3/2003 | Cahill | G06T 1/0028 382/100 |
| 2004/0031906 A1 | * | 2/2004 | Glecker | G01J 3/02 250/208.1 |
| 2009/0002835 A1 | * | 1/2009 | Prior | G02B 27/0025 359/637 |
| 2009/0091738 A1 | * | 4/2009 | Morcom | G01S 17/08 356/5.03 |
| 2014/0367558 A1 | * | 12/2014 | Raskar | H04N 5/243 250/216 |

* cited by examiner

METHODS AND APPARATUS FOR HIGH SPEED CAMERA

RELATED APPLICATIONS

This application is a non-provisional of, and claims the benefit of the filing date of, U.S. Provisional Application Ser. No. 61/836,479, filed Jun. 18, 2013, the entire disclosure of which is herein incorporated by reference.

FIELD OF THE TECHNOLOGY

The present invention relates generally to imaging equipment, including cameras.

SUMMARY

In exemplary implementations of this invention, a camera can capture multiple millions of frames per second, such that each frame is a 2D image, rather than a 1D streak.

The camera includes a light source that emits ultrashort pulses of light to illuminate a scene. For example, each light pulse may last 100 femtoseconds; and a sequence of the light pulses may comprise a periodic waveform with a period of 10 nanoseconds.

The camera also includes an imaging apparatus. The imaging apparatus includes a photocathode, a set of M phosphor blocks, and a light sensor. Each respective phosphor block comprises a separate phosphor screen, or a subregion of a larger phosphor screen. Incoming light strikes the photocathode, causing the photocathode to emit electrons that travel to the phosphor blocks. The phosphor blocks detect these emitted electrons. The phosphor blocks then emit photons which are detected by the light sensor.

An electric field deflects electrons traveling from the photocathode to the phosphor blocks. Voltage is applied to two or more plates in a temporal "stepladder" pattern, causing the electric field to vary in a temporal "stepladder" pattern. The stepladder voltage pattern is such that: (a) during a first period of time, a majority of the emitted electrons strike only a first phosphor block; (b) during a second period of time, a majority of the emitted electrons strike only a second phosphor block; (c) and so on, until during an $M^{th}$ period of time, a majority of the emitted electrons strike only the $M^{th}$ phosphor block. During this temporal sequence, the M phosphor blocks (together with the light sensor) capture M frames, one frame per phosphor block.

Incoming light passes through at least one 2D aperture (rather than a 1D slit) before striking the photocathode. Each phosphor block records a 2D image of the entire scene. Thus, in each respective frame of the above temporal sequence, a phosphor block is used (together with the light sensor) to capture a 2D image of the scene.

This setup involves a tradeoff between temporal resolution and spatial resolution: Temporal resolution can be increased by dividing the light sensor into a greater number of phosphor blocks. However, the greater the number of phosphor blocks, the less the number of pixels per phosphor block along an axis of deflection, and thus the less the spatial resolution along that axis.

However, a mask may be used to increase resolution. For example, a physical mask may be positioned before the photocathode (at, before or after a 2D aperture). The mask design is such that the measurement is computationally invertible or can be used in an optimization algorithm. Alternatively, the effect of a mask may be emulated by simultaneously applying different voltages to different pairs of plates, so as to create different electric fields, such that the electric fields differ from each other at least in magnitude. In that case, deflection may vary, depending on a 2D position of incoming light at an aperture plane.

The description of the present invention in the Summary and Abstract sections hereof is just a summary. It is intended only to give a general introduction to some illustrative implementations of this invention. It does not describe all of the details of this invention. This invention may be implemented in many other ways. Likewise, the description of this invention in the Field of the Technology section is not limiting; instead it identifies, in a general, non-exclusive manner, a field of technology to which exemplary implementations of this invention generally relate.

BRIEF DESCRIPTION OF THE DRAWINGS

FIG. 6 shows two examples of a mask.

The above Figures show some illustrative implementations of this invention, or provide information that relates to those implementations. However, this invention may be implemented in many other ways.

DETAILED DESCRIPTION

Figure 1:
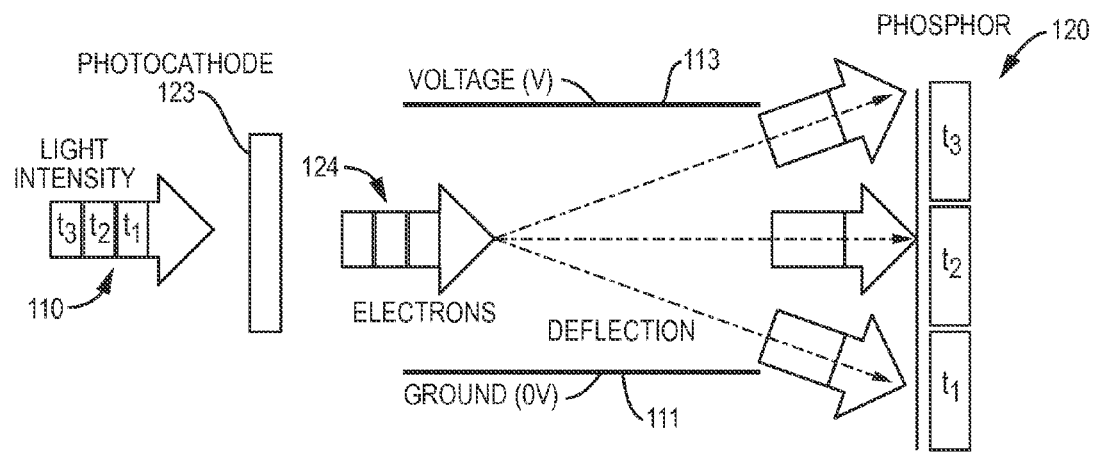
FIG. 1 shows an example of an electric field being used to deflect electrons onto different phosphor blocks.

FIG. 1 shows an example of an electric field being used to deflect electrons onto different phosphor blocks. In the example shown in FIG. 1: Pulses of reflected light 110 arrive at a light sensor at times $t_1$, $t_2$, $t_3$ and strike a photocathode 123. The photocathode 123 absorbs incoming light from the pulses and emits electrons 124 that travel to phosphor blocks 120. A temporal "stepladder" pattern of voltage is applied to two plates 111, 113, such that: (a) the emitted electrons for the light pulse that arrived at time $t_1$ strike only a first phosphor block; (b) the emitted electrons for the light pulse that arrived at time $t_2$ strike only a second phosphor block; and (c) the emitted electrons for the light pulse that arrived at time $t_3$ strike only a third phosphor block.

Figure 2:
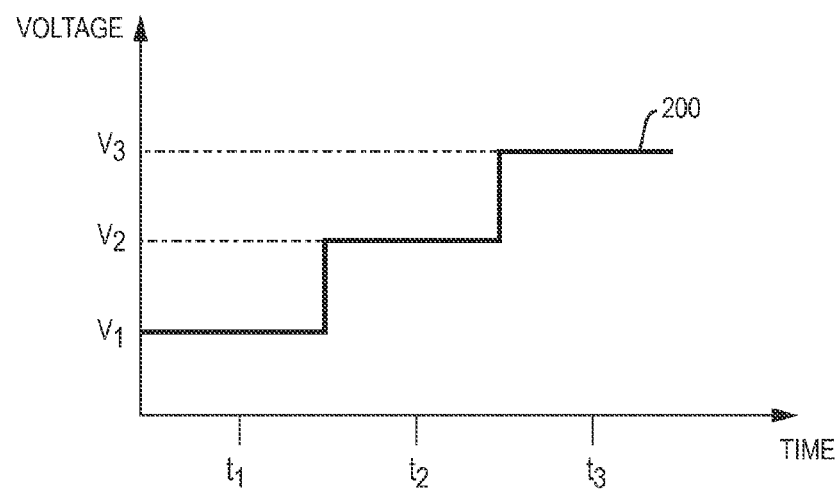
FIG. 2 shows an example of a temporal "stepladder" pattern of voltage.

FIG. 2 shows an example of a temporal "stepladder" pattern of voltage 200 that is applied to deflect emitted electrons to different phosphor blocks. In the example shown in FIG. 2: (a) the voltage is $V_1$ at time $t_1$; (b) the voltage is $V_2$ at time $t_2$; and (c) the voltage is $V_3$ at time $t_3$.

Figure 3:
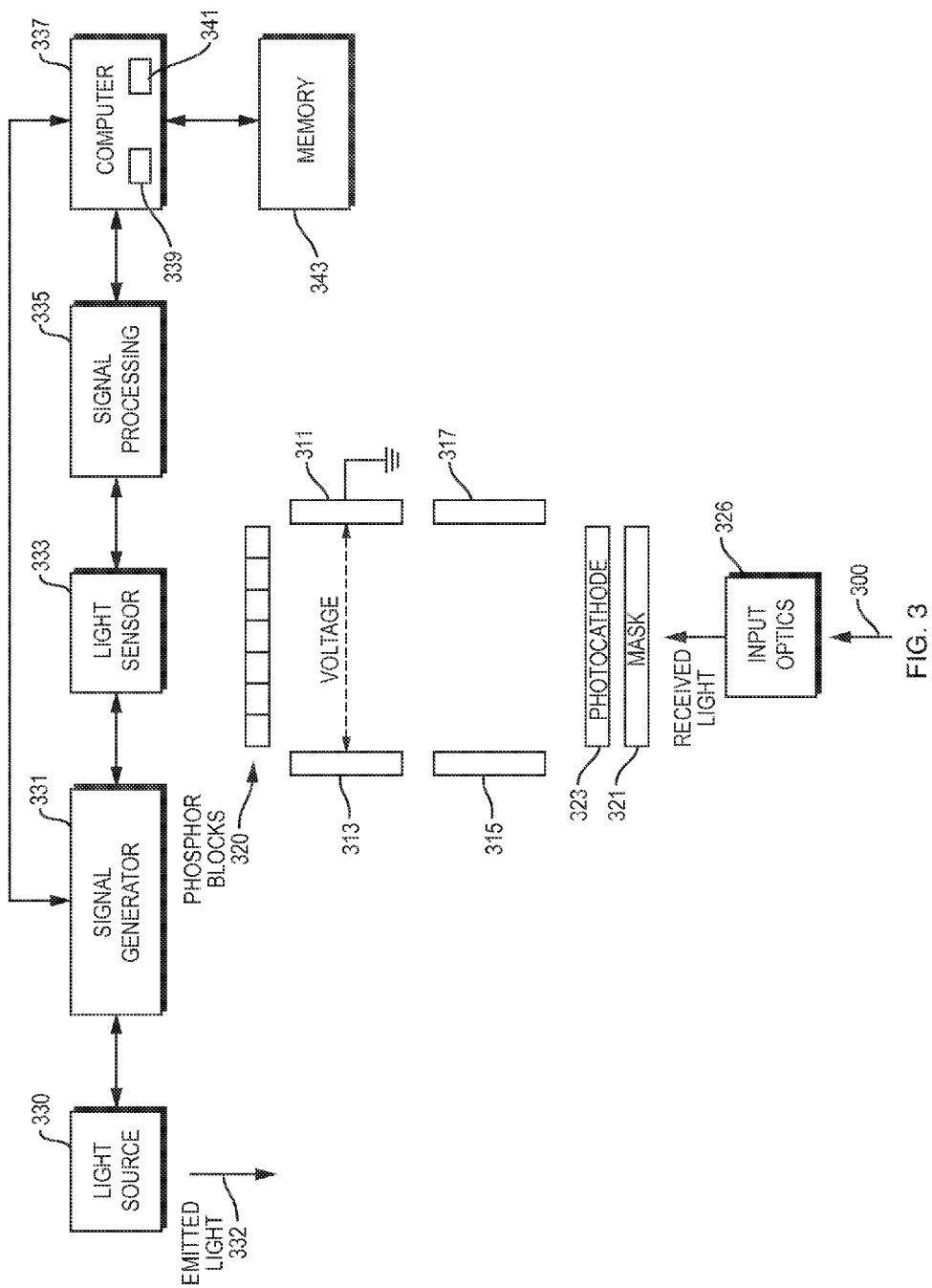
FIG. 3 shows hardware components of a camera.

FIG. 3 shows hardware components of a camera. In the example shown in FIG. 3: A light source 330 emits pulses of light 332. For example, the light source 330 may comprise a femtosecond laser; or a picosecond laser; or a picosecond light emitting diode. A signal generator 331 produces a first electrical signal for controlling the timing of the light pulses emitted by the light source 330 and a second electrical signal (e.g., a clock signal) for controlling timing of the light sensor 333 and timing of the "stepladder" voltage. (The first and second signals may be, but are not necessarily, the same signal. For example, the first and second signals may be identical in phase and frequency, but not in amplitude). Alternatively (instead of the signal generator 331 producing the second electrical signal), the camera may instead include an optical trigger to detect an incoming pulse of light and thus to control timing of the light sensor and step-ladder voltage.

Signal processing equipment 335 converts analog sensor readings to a digital signals, and otherwise processes signals from a light sensor 333, and outputs signals to a computer 337. One or more processors (e.g., 339, 341) in the computer 337 analyze the sensor data. Data may be stored in an electronic memory device 343.

Reflected light 300 from a scene passes through input optics 326 and a mask 321 before striking a photocathode 323. The input optics 326 may include, for example, a first 2D aperture and a second 2D aperture, such that incoming light passes first through the first aperture and then through the second aperture before reaching the mask 321. Or, the mask 321 may be co-located with an aperture. The photocathode 323 absorbs photons of incoming light and emits electrons. The camera may include electrostatic particle accelerators (e.g., 315, 317) for accelerating the emitted electrons. The emitted electrons are deflected in varying amounts by an electric field created by a voltage between two parallel plates 311, 313. The voltage applied, and thus the electric field created, varies in a temporal "stepladder" pattern, such that, at each step of the "stepladder", the emitted electrons are deflected to a different phosphor block in an array of phosphor blocks 320. Each phosphor block comprises a separate phosphor screen, or a subregion of a larger phosphor screen. The phosphor blocks absorb energy from the electrons and emit photons of light, which are detected by the light sensor 333. For example, the light sensor 333 may be either a CMOS (complimentary metal-oxide semiconductor) or CCD (charge-coupled-device) sensor.

Figure 4:
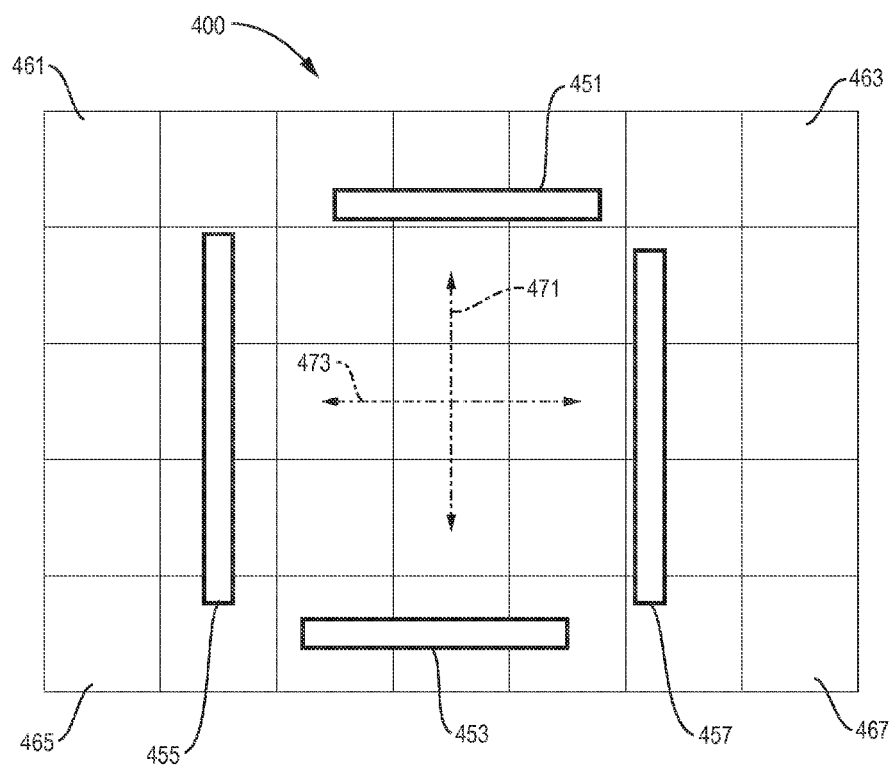
FIG. 4 shows an alternative implementation, in which four electric plates deflect electrons onto different phosphor blocks in a 2D array of phosphor blocks.

FIG. 4 shows an alternative implementation, in which four electric plates deflect electrons to any given phosphor block in a 2D array of phosphor blocks. A 2D array of phosphor blocks 400-comprises multiple rows and columns of phosphor blocks, including phosphor blocks 461, 463, 465, 467. A first voltage and second voltage are applied simultaneously. The first voltage is applied to two plates 451, 453 and causes electrons emitted from the photocathode to deflect in a vertical direction 471. The second voltage is applied to two other plates 455, 457 and causes electrons emitted from the photocathode to deflect in a horizontal direction 473. By varying the first and second voltages, the emitted electrons can be deflected to any particular phosphor block in the 2D array of phosphor blocks 400.

Figure 5:
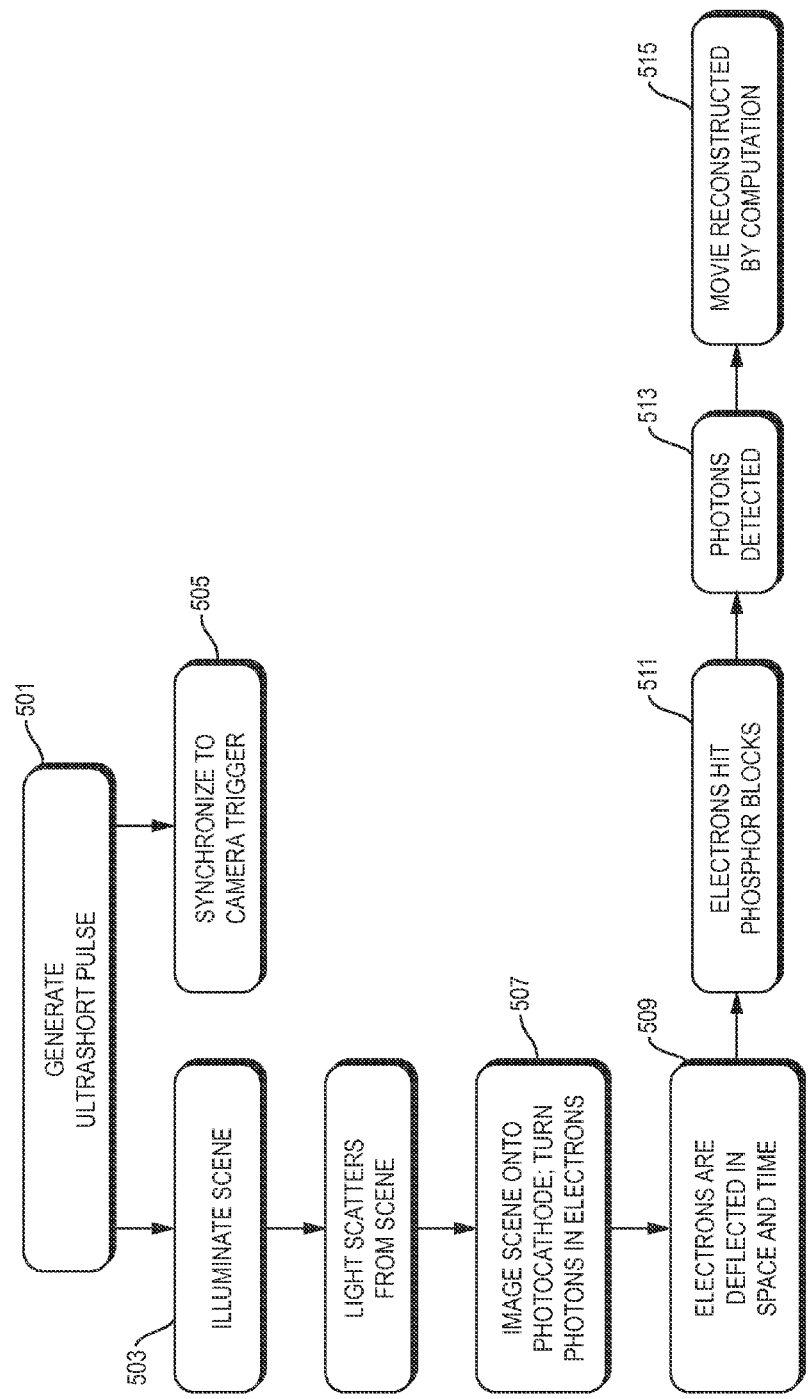
FIG. 5 shows steps in an imaging method.

FIG. 5 shows steps in an imaging method. In the example shown in FIG. 5, the imaging method includes the following steps: Use a light source to generate an ultrashort pulse of light 501. The emitted light pulse illuminates a scene 503. The emitted light pulse is synchronized to a camera trigger 505. Light scatters from the scene. The scene is imaged unto a photocathode, which absorbs photons of the incoming light and emits electrons 507. A time-varying voltage is applied to plates, to deflect the electrons in space and time 509. The deflected electrons hit phosphor blocks 511. The phosphor blocks absorb energy from the electrons and emit photons of light, which are detected by a light sensor 513. One or more processors perform reconstructions to reconstruct a movie from the sequential frames captured by different phosphor blocks 515.

In some implementations of this invention, a mask is employed in order to improve the resolution of the camera. The mask is positioned in the optical path of incoming light, such that the incoming light passes through the mask before reaching the photodetector. For example, the mask may be located at a 2D aperture.

In some implementations, the mask pattern is such that a system function, which mathematically describes the imaging system (including the mask and light sensor), is invertible. In these implementations, the imaging system (including mask and light sensor) can be mathematically modeled as a system function which maps input to the system (incident light) to output of the system (measured light intensity). In these implementations, a unique inverse function exists, which (i) is the inverse of the system function and (ii) maps output of the system (measured light intensity) to input of the system (incident light). The inverse function can be calculated from the system function. One or more processors can use the inverse function and the output (measured light intensity) to calculate the input (incident light).

In other implementations, the mask pattern is such that the system function is not invertible. If the system function is not invertible, then the input can be recovered (which is equivalent to creating the movie of the scene) by inserting the known system function and the measured output into an optimization algorithm, which calculates the best input that agrees with the measured output. For example, the algorithm can iteratively or non-iteratively create a potential input data candidate such that the "difference" between the measured data and the estimated data calculated by the system function and the candidate input is minimized. The "difference" can be, for example, a Euclidean norm.

The invertibility of the system function depends on the imaging system (including the mask and light sensor) and not on the scene. Consider a linear system described by input vector X, output vector b, and matrix A, where Ax=b. The system is completely described by A, and the equation is invertible if there exists a matrix $A^{-1}$ such that $A^{-1}A=I$, where I is an identity matrix. A system does not need to be linear for its system function to be invertible, and not all linear systems have invertible system functions.

If the system function is not invertible, then processors can approximate input X by solving an optimization problem. For example, the processors may select entries of input X such that the objective function $J=\|b-Ax\|_2^2$ is minimized, where $\|F\|_2^2$ is the sum of the squares of the entries of F. Alternatively, other types of objective functions can be used.

If information about the scene is known (i.e., there is prior knowledge about the scene), then (a) the imaging system (including the mask) can be chosen such that the system function is invertible; or (b) an appropriate objective function J to minimize can be chosen.

In some implementations of this invention, the imaging system (including the mask) is used for compressive sensing of a sparse scene. In that case, prior knowledge of the sparse scene may be employed to select a mask design such that the imaging system (including the mask) is optimized to be incoherent with the sparse scene.

Sparsity means that the signal can be represented as a vector whose number of nonzero elements are far less than the length of the vector. For example, consider a first scene that contains only a few bright spots (like stars in a night sky). Most scene "pixels" are 0 (dark), with only a few non-dark pixels (bright). This first scene is sparse in the pixel basis. Or, for example, consider a second scene that contains only a few cosine patterns (e.g., 2 or 3 different cosines). This second scene is sparse in the frequency (or Fourier) basis.

The imaging system is incoherent with respect to a sparse scene if, when the system function matrix A operates on the sparse vector, each of the nonzero elements of the sparse vector contributes to all the elements in the measurement vector. Colloquially, think of an incoherent system as smearing out all the nonzero input entries into all the output entries. The coherence is defined as the maximal inner product between any pair of columns of the measurement matrix. The lower this number, the more incoherent the system.

The mask may be implemented as a binary spatial light modulator (SLM): that is, some areas of the SLM are transparent to light, and other areas of the SLM are opaque. Alternatively, the mask may comprise a grayscale mask, such that the percentage of light transmitted by different "pixels" of the SLM has at least three possible values. For example, a LCD (liquid crystal display) can display a time-varying grayscale mask. Or, for example, a time-invariant grayscale mask may be manufactured by dithering with a printer.

Alternatively, the mask may comprise a phase delay mask. For example, a phase delay mask may comprise an SLM in which each respective "pixel" of the SLM exhibits a different delay (e.g., transmits light during a different time window). Or, for example, a phase delay mask may employ so-called echelons, where the echelons are physical "staircases" of transparent or translucent material (e.g., glass); the total height of each step in the physical "staircase" being proportional to the delay. Or, for example, a phase delay mask may comprise a fiber bundle, in which (i) each respective fiber functions as a pixel of the mask, and (ii) fibers of different lengths create different delays.

Alternately, instead of using a physical mask, the voltage applied to create the electric field to deflect the electrons may vary as a function of both time and space. In that case, instead of single pair of plates, multiple pairs of smaller plates may be used. Different voltages can simultaneously be applied, one respective voltage per pair of plates, to control the deflection of electrons that are emitted by the photocathode, such that the deflection is different for different pixels of the aperture and different pixels of the photocathode).

Figure 6B:
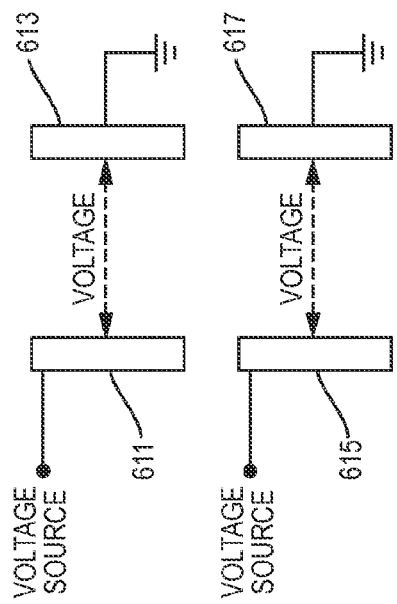
In FIG. 6B, the effect of a mask is emulated by applying different voltages to different pairs of plates.
Figure 6A:
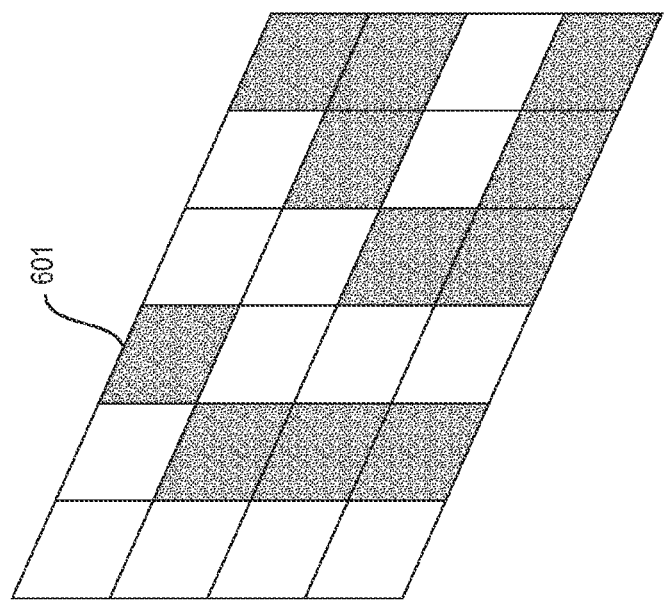
In FIG. 6A, the mask is a spatial light modulator (SLM).

FIG. 6 shows two examples of a mask. In FIG. 6A, the mask is a spatial light modulator (SLM). In FIG. 6B, the effect of a mask is emulated by applying different voltages to different pairs of plates.

In the example shown in FIG. 6A, a spatial light modulator 601 is located at a 2D aperture and spatially modulates incoming light passing through the aperture. For example, the SLM 601 may comprise a binary mask, grayscale mask or phase delay mask.

In the example shown in FIG. 6B, different voltages are applied to different pairs of plates (e.g., to a first pair of plates 611, 613, and to a second pair of plates 615, 617). The plates are arranged in two parallel rows. The plate arrangement shown in FIG. 6B may be used to simultaneously apply different voltages to different pairs of plates, so as to create different electric fields, such that the electric fields differ from each other at least in magnitude.

Electrons emitted by the photocathode pass through this electric field. Thus, at any given time, the deflection of electrons can be different for different pixels of the aperture. In the example shown in FIG. 6B, "staircase" voltage sweeps are used. For example, a first staircase of voltages $V_1, V_2, V_3$ may be applied to the first pair of plates 611, 613, and a second staircase of voltages $V_4, V_5, V_6$ may be applied to the second pair of plates 615, 617.

In some implementations of this invention: (a) one or more electrostatic particle accelerators (e.g., 315, 317) accelerate electrons emitted by different pixels of the photocathode to different energies; (b) electrons with different energies are deflected to different phosphor blocks in a set of phosphor blocks; (c) different phosphor blocks in the set comprise different materials, such that each respective phosphor block in the set emits photons at a different color; (d) the light sensor comprises a CCD hyperspectral imager which can detect different colors; and (e) thus, each pixel of the photocathode (and thus each pixel of the aperture) can be decoded from the color code. In some of these "color code" implementations of this invention, different voltages simultaneously applied to different pairs of plates create different electric fields that deflect electrons emitted by different pixels of the photocathode by different amounts.

In some implementations of this invention, the camera performs conventional time-of-flight depth detection. For example, the detector may measure the total time between emission and echo detection. This time $T_r$ is the round-trip time and is used to calculate depth d of the scene, as follows: $d=cT_r/2$, where c is the speed of light. However, occlusions, multiple scattering events, and transparent/translucent/turbid/diffuse media may cause this depth calculation to be inaccurate.

In exemplary implementations of this invention, one or more electronic processors are specially adapted: (1) to control the operation of, or interface with, hardware components of a camera, including any light source, any light sensor, any time-varying mask, and any voltage sources for applying time-varying voltages to control an electric field for deflecting electrons; (2) to perform calculations to create a video from a series of frames; (3) to perform calculations that use an inverse system function and measured light to calculate incident light; (4) to perform an optimization algorithm that uses a system function and measured light to recover incident light; (5) to perform calculations to reconstruct pixel information from spectral data captured by a hyperspectral light sensor; (6) to receive signals indicative of human input, (7) to output signals for controlling transducers for outputting information in human perceivable format, and (8) to process data, to perform computations, to execute any algorithm or software, and to control the read or write of data to and from memory devices. The one or more processors may be located in any position or positions within or outside of the camera. For example: (a) at least some of the one or more processors may be embedded within or housed together with other components of the camera, such as the signal generator, light source, light sensor, or other electronic components of the camera; and (b) at least some of the one or more processors may be remote from other components of the camera. The one or more processors may be connected to each other or to other components in the camera either: (a) wirelessly, (b) by wired connection, or (c) by a combination of wired and wireless connections. For example, one or more electronic processors (e.g., 339, 341) may be housed in a computer (e.g., 337 in FIG. 3).

DEFINITIONS

Here are a few definitions and clarifications.

"1D" means one dimensional.

"2D" means two dimensional.

"2D image" means an image that is not captured through a slit aperture.

The terms "a" and "an", when modifying a noun, do not imply that only one of the noun exists.

The term "camera" shall be construed broadly. Here are some non-limiting examples of a "camera": (a) an optical instrument that records images; (b) a digital camera; (c) a camera that uses photographic film or a photographic plate; (d) a light field camera; (e) a time-of-flight camera; (f) an imaging system, (g) a light sensor; (h) apparatus that includes a light sensor; or (i) apparatus for gathering data about light incident on the apparatus.

The term "comprise" (and grammatical variations thereof) shall be construed broadly, as if followed by "without limitation". If A comprises B, then A includes B and may include other things.

"Defined Term" means a term that is set forth in quotation marks in this Definitions section.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

A "Fixed Increment Voltage Pattern" is a pattern of voltage vs. time, in which voltage increases by an increment amount, then remains constant for a fixed amount of time, then increases by the increment amount, then remains constant for the fixed amount of time, then increases the increment amount, and so on. For example, the stepladder voltage pattern shown in FIG. 2 is a Fixed Increment Voltage Pattern.

The term "for instance" means for example.

The term "frame" shall be construed broadly. For example, the term "frame" includes measured data about a scene that is captured by a camera during a single time period or single exposure, even if (i) the data is not humanly perceptible, (ii) the data has not been computationally processed, and (iii) there is not a one-to-one mapping between the data and the scene being imaged.

In the context of a camera (or components of the camera), "front" is optically closer to the scene being imaged, and "rear" is optically farther from the scene, during normal operation of the camera.

"Herein" means in this document, including text, specification, claims, abstract, and drawings.

The terms "horizontal" and "vertical" shall be construed broadly. For example, "horizontal" and "vertical" may refer to two arbitrarily chosen coordinate axes in a Euclidian two dimensional space, regardless of whether the "vertical" axis is aligned with the orientation of the local gravitational field. For example, a "vertical" axis may oriented along a local surface normal of a physical object, regardless of the orientation of the local gravitational field.

The term "include" (and grammatical variations thereof) shall be construed broadly, as if followed by "without limitation".

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure, radiant energy density, or number of photons.

The term "light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

The term "magnitude" means absolute value.

The term "matrix" includes a matrix that has two or more rows, two or more columns, and at least one non-zero entry. The term "matrix" also includes a vector that has at least one non-zero entry and either (a) one row and two or more columns, or (b) one column and two or more rows. However, as used herein, (i) a scalar is not a "matrix", and (ii) a rectangular array of entries, all of which are zero (i.e., a so-called null matrix), is not a "matrix".

To "multiply" includes to multiply by an inverse. Thus, to "multiply" includes to divide.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

"Phosphor" means any material that exhibits luminescence. For example, the luminescence may be phosphorescence, fluorescence, or photoluminescence.

To compute a term that "satisfies" an equation: (a) does not require that calculations involve terms, variables or operations that are in the equation itself, as long as the term itself (subject to error, as described in part (b) of this sentence) is computed; and (b) includes computing a solution that differs from a correct solution by an error amount, which error amount arises from one or more of (i) rounding, (ii) other computational imprecision, including error due to modeling a continuous signal by a discrete signal or due to using an insufficiently small step size in calculations, and (iii) signal noise or other physical limitations of sensors or other physical equipment.

As used herein, the term "set" does not include a so-called empty set (i.e., a set with no elements). Mentioning a first set and a second set does not, in and of itself, create any implication regarding whether or not the first and second sets overlap (that is, intersect).

A "spatial light modulator", also called an "SLM", is a device that (i) either transmits light through the device or reflects light from the device, and (ii) either (a) attenuates the light, such that the amount of attenuation of a light ray incident at a point on a surface of the device depends on at least the 2D spatial position of the point on the surface; or (b) changes the phase of the light, such that the phase shift of a light ray incident at a point on a surface of the device depends on at least the 2D spatial position of the point on the surface. A modulation pattern displayed by an SLM may be either time-invariant or time-varying.

As used herein, a "subset" of a set consists of less than all of the elements of the set.

The term "such as" means for example.

To "apply voltage to" a pair of plates means to create a voltage difference between the respective plates in the pair, for example, by attaching one plate to electrical ground and attaching the other plate to a voltage source.

Spatially relative terms such as "under", "below", "above", "over", "upper", "lower", and the like, are used for ease of description to explain the positioning of one element relative to another. The terms are intended to encompass different orientations of an object in addition to different orientations than those depicted in the figures.

A matrix may be indicated by a bold capital letter (e.g., D). A vector may be indicated by a bold lower case letter (e.g., a). However, the absence of these indicators does not indicate that something is not a matrix or not a vector.

Except to the extent that the context clearly requires otherwise, if steps in a method are described herein, then: (1) steps in the method may occur in any order or sequence, even if the order or sequence is different than that described; (2) any step or steps in the method may occur more than once; (3) different steps, out of the steps in the method, may occur a different number of times during the method, (4) any step or steps in the method may be done in parallel or serially; (5) any step or steps in the method may be performed iteratively; (5) a given step in the method may be applied to the same thing each time that the particular step occurs or may be applied to different things each time that the given step occurs; and (6) the steps described are not an exhaustive listing of all of the steps in the method, and the method may include other steps.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, grammatical variations include noun, verb, participle, adjective, or possessive forms, or different declensions, or different tenses. In each case described in this paragraph, Applicant is acting as Applicant's own lexicographer.

Variations:

This invention may be implemented in many different ways, in addition to those described above.

Here are some non-limiting examples of how this invention may be implemented:

This invention may be implemented as a method comprising, in combination: (a) using a photocathode to emit electrons in response to incoming light, which light is reflected from a scene and hits the photocathode; (b) applying voltage to a pair of plates in a temporally varying voltage pattern so as to cause the electrons to be deflected to different phosphor blocks in a set of phosphor blocks at different times, such that, for each respective time period in a sequence of time periods during the temporally varying voltage pattern, a majority of electrons emitted by the photocathode are deflected to a respective phosphor block in the set of phosphor blocks; and (c) using a light sensor to detect light emitted by the phosphor blocks; wherein (i) each respective phosphor block comprises a separate phosphor screen or a subregion of a phosphor screen, and (ii) during each respective time period in the sequence, the light sensor captures a 2D image of the scene. Furthermore: (1) A light source may emit a pulse of light. (2) The voltage pattern may comprise a Fixed Increment Voltage Pattern. (3) A mask may spatially modulate the incoming light. (4) The mask may comprise a binary mask. (5) The mask may comprise a grayscale mask. (6) The mask may comprise a phase delay mask. (7) The method may further comprise simultaneously applying different voltages to different pairs of plates, so as to create different electric fields, such that the electric fields differ from each other at least in magnitude and deflect the electrons by different amounts. (8) The light sensor, photocathode and mask may be parts of a camera. A system function may exist, which system function mathematically describes the camera, such that the system function maps input of the system to output of the system, the input comprising incident light and the output comprising measured light intensity. An inverse function may exist, which inverse function is a unique inverse of the system function and maps the output to the input. One or more processors may perform computations, which computations recover the input from the output and the inverse function. (9) The light sensor, photocathode and mask may be parts of a camera. A system function may exist, which system function mathematically describes the camera, such that the system function maps input of the system to output of the system, the input comprising incident light and the output comprising measured light intensity. One or more processors may perform computations, which computations involve using an optimization algorithm to estimate input of the camera from the system function and output of the system, the input comprising incident light and the output comprising measured light intensity. (10) A first set of electrons may be emitted by a first region of the photocathode and not by a second region of the photocathode. A second set of electrons may be emitted by the second region and not by the first region. One or more electrostatic particle accelerators may accelerate the first and second sets of electrons, such that (i) a majority of the first set of electrons is deflected to a first phosphor block, and (ii) a majority of the second set of electrons is deflected to a second phosphor block. The first phosphor block may emit light in a first frequency band and not in a second frequency band. The second phosphor block may emit light in the second frequency band and not in the first frequency band.

This invention may be implemented as a method comprising, in combination: (a) using a photocathode to emit electrons in response to incoming light, which light is reflected from a scene and hits the photocathode; (b) applying voltage to a pair of plates in a Fixed Increment Voltage Pattern so as to cause the electrons to be deflected to different phosphor blocks in a set of phosphor blocks at different times, such that, for each respective time period in a sequence of time periods during the Fixed Increment Voltage Pattern, a majority of electrons emitted by the photocathode are deflected to a respective phosphor block in the set of phosphor blocks; and (c) using a light sensor to detect light emitted by the phosphor blocks; wherein each respective phosphor block comprises a separate phosphor screen or a subregion of a phosphor screen.

This invention may be implemented as a system comprising, in combination (a) a photocathode for emitting electrons in response to being struck by incoming light; (b) a set of phosphor blocks for emitting light in response to being struck by the emitted electrons; (c) a voltage source for applying voltage to a pair of conductive plates in a temporally varying voltage pattern, such that (i) electrons emitted by the photocathode are deflected to different phosphor blocks in the set of phosphor blocks at different times; and (ii) during each respective time period in a sequence of time periods during the temporally varying voltage pattern, a majority of electrons emitted by the photocathode are deflected to a respective phosphor block in the set of phosphor blocks; and (d) a light sensor for detecting light emitted by the phosphor blocks; wherein (i) each respective phosphor block comprises a separate phosphor screen or a subregion of a phosphor screen, and (ii) during each respective time period in the sequence, the light sensor captures a 2D image of the scene. Furthermore: (1) The voltage pattern may comprise a Fixed Increment Voltage Pattern. (2) A light source may emit a pulse of light. (3) A mask may modulate the incoming light. (4) The voltage source may be configured to simultaneously apply different voltages to different pairs of conductive plates, so as to create different electric fields, such that the electric fields differ from each other at least in magnitude and deflect the electrons by different amounts. (5) The light sensor, photocathode and mask may be parts of a camera. A system function may exist, which system function mathematically describes the camera, such that the system function maps input of the system to output of the system, the input comprising incident light and the output comprising measured light intensity. An inverse function may exist, which inverse function is a unique inverse of the system function and maps the output to the input. (6) The set of phosphor blocks may include a first phosphor block for emitting light in a first frequency band and not in a second frequency band. The set of phosphor blocks may also include a second phosphor block for emitting light in the second frequency band and not in the first frequency band. (7) One or more electrostatic particle accelerators may accelerate the electrons, such that (i) a majority of a first set of electrons is deflected to the first phosphor block, and (ii) a majority of a second set of electrons is deflected to a second phosphor block. The first set of electrons may consist of electrons that are emitted by a first region of the photocathode and not by a second region of the photocathode. The second set of electrons may consist of electrons that are emitted by the second region and not by the first region.

While exemplary implementations are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also within the scope of the present invention. Numerous modifications may be made by one of ordinary skill in the art without departing from the scope of the invention.

What is claimed is:

1. A method comprising, in combination:
   (a) a mask spatially modulating light that reflects from a scene;
   (b) a photocathode emitting electrons in response to light that hits the photocathode after reflecting from the scene and being spatially modulated by the mask;
   (c) applying voltage to a pair of plates in a temporally varying voltage pattern so as to cause the electrons to undergo deflection such that (i) the electrons are deflected to different phosphor blocks in a set of phosphor blocks at different times, and (ii) for each respective time period in a sequence of time periods during the temporally varying voltage pattern, a majority of electrons emitted by the photocathode are deflected to a respective phosphor block in the set of phosphor blocks; and
   (d) a light sensor detecting light emitted by the phosphor blocks;
   wherein
   (i) the photocathode, plates, phosphor blocks, light sensor and mask comprise an imaging system, and
   (ii) resolution of the imaging system, with the mask spatially modulating reflected light from the scene, is greater than the resolution of the imaging system would be in the absence of the mask.

2. The method of claim 1, wherein the method further comprises a light source emitting a pulse of light.

3. The method of claim 1, wherein the voltage pattern comprises a Fixed Increment Voltage Pattern.

4. The method of claim 1, wherein the imaging system is optimized to be incoherent with respect to the scene.

5. The method of claim 1, wherein the mask comprises a binary mask.

6. The method of claim 1, wherein the mask comprises a grayscale mask.

7. The method of claim 1, wherein the mask comprises a phase delay mask.

8. The method of claim 1, wherein:
   (a) the method further comprises simultaneously applying different voltages to different pairs of plates, so as to create different electric fields, such that the electric fields differ from each other at least in magnitude and deflect the electrons by different amounts; and
   (b) the deflection varies, depending on the 2D position of incoming light at an aperture plane.

9. The method of claim 1, wherein:
   (a) the light sensor, photocathode and mask are parts of a camera;
   (b) a system function exists, which system function mathematically describes the camera, such that the system function maps input of the system to output of the system, the input comprising incident light and the output comprising measured light intensity;
   (c) an inverse function exists, which inverse function is a unique inverse of the system function and maps the output to the input; and
   (d) the method further comprises one or more processors performing computations, which computations recover the input from the output and the inverse function.

10. The method of claim 1, wherein:
    (a) the light sensor, photocathode and mask are parts of a camera;
    (b) a system function exists, which system function mathematically describes the camera, such that the system function maps input of the system to output of the system, the input comprising incident light and the output comprising measured light intensity; and
    (c) the method further comprises one or more processors performing an optimization algorithm to estimate input of the camera from the system function and output of the system, the input comprising incident light and the output comprising measured light intensity.

11. A method comprising:
(a) a first region of a photocathode emitting a first set of electrons;
(b) a second region of the photocathode emitting a second set of electrons;
(c) one or more electrostatic particle accelerators accelerating the first and second sets of electrons, such that (i) the first set of electrons is deflected to a first phosphor block, and (ii) the second set of electrons is deflected to a second phosphor block;
(d) the first phosphor block emitting, in response to being hit by the first set of electrons, light in a first frequency band and not in a second frequency band; and
(e) the second phosphor block emitting, in response to being hit by the second set of electrons, light in the second frequency band and not in the first frequency band;
wherein the first region of the photocathode does not emit the second set of electrons and the second region of the photocathode does not emit the first set of electrons.

12. A method comprising, in combination:
(a) a photocathode emitting electrons in response to incoming light, which light is reflected from a scene and hits the photocathode;
(b) simultaneously applying different voltages to different pairs of plates in a temporally varying voltage pattern so as to create different electric fields that cause the electrons to undergo deflection, such that (i) the electrons are deflected to different phosphor blocks in a set of phosphor blocks at different times, and (ii) the deflection varies, depending on the 2D position of incoming light at an aperture plane; and
(c) a light sensor detecting light emitted by the phosphor blocks.

13. A system comprising, in combination:
(a) a mask for spatially modulating light that reflects from a scene;
(b) a photocathode for emitting electrons in response to light that hits the photocathode after reflecting from the scene and being spatially modulated by the mask;
(c) a set of phosphor blocks for emitting light in response to being struck by the emitted electrons;
(c) a voltage source for applying voltage to a pair of conductive plates in a temporally varying voltage pattern, such that (i) electrons emitted by the photocathode are deflected to different phosphor blocks in the set of phosphor blocks at different times, and (ii) during each respective time period in a sequence of time periods during the temporally varying voltage pattern, a majority of electrons emitted by the photocathode are deflected to a respective phosphor block in the set of phosphor blocks; and
(d) a light sensor for detecting light emitted by the phosphor blocks; wherein
(i) the photocathode, plates, phosphor blocks, light sensor and mask comprise an imaging system, and
(ii) resolution of the imaging system, with the mask for spatially modulating light that reflects from the scene, is greater than the resolution of the imaging system would be in the absence of the mask.

14. The system of claim 13, wherein the voltage pattern comprises a Fixed Increment Voltage Pattern.

15. The system of claim 13, wherein the system further comprises a light source for emitting a pulse of light.

16. The system of claim 13, wherein the imaging system is optimized to be incoherent with respect to the scene.

17. The system of claim 13, wherein:
(a) the system further comprises a set of pairs of conductive plates;
(b) the voltage source is configured to simultaneously apply different voltages to different pairs of plates, so as to create different electric fields, such that the electric fields differ from each other at least in magnitude and deflect the electrons by different amounts; and
(c) deflection of the electrons varies, depending on the 2D position of incoming light at an aperture plane.

18. The system of claim 16, wherein:
(a) the light sensor, photocathode and mask are parts of a camera;
(b) a system function exists, which system function mathematically describes the camera, such that the system function maps input of the system to output of the system, the input comprising incident light and the output comprising measured light intensity; and
(c) an inverse function exists, which inverse function is a unique inverse of the system function and maps the output to the input.

19. The system of claim 13, wherein:
(a) the set of phosphor blocks includes a first phosphor block for emitting light in a first frequency band and not in a second frequency band; and
(b) the set of phosphor blocks includes a second phosphor block for emitting light in the second frequency band and not in the first frequency band.

20. The system of claim 19, wherein:
(a) the system further comprises one or more electrostatic particle accelerators for accelerating the electrons, such that (i) a majority of a first set of electrons is deflected to the first phosphor block, and (ii) a majority of a second set of electrons is deflected to a second phosphor block;
(b) the first set of electrons consists of electrons that are emitted by a first region of the photocathode and not by a second region of the photocathode; and
(c) the second set of electrons consists of electrons that are emitted by the second region and not by the first region.

* * * * *